United States Patent
Mueller et al.

(10) Patent No.: US 8,062,565 B2
(45) Date of Patent: Nov. 22, 2011

(54) LOW DENSITY NON-WOVEN MATERIAL USEFUL WITH ACOUSTIC CEILING TILE PRODUCTS

(75) Inventors: Donald S. Mueller, Ivanhoe, IL (US); Bangji Cao, Naperville, IL (US); Weixin D. Song, Vernon Hills, IL (US); Qing Yu, Libertyville, IL (US)

(73) Assignee: USG Interiors, Inc., Chicago, IL (US)

( * ) Notice: Subject to any disclaimer, the term of this patent is extended or adjusted under 35 U.S.C. 154(b) by 307 days.

(21) Appl. No.: 12/487,000

(22) Filed: Jun. 18, 2009

(65) Prior Publication Data

US 2010/0320029 A1     Dec. 23, 2010

(51) Int. Cl.
*B28B 1/26* (2006.01)
*D21F 13/00* (2006.01)

(52) U.S. Cl. ............. 264/86; 264/87; 264/122; 162/152

(58) Field of Classification Search ........................ None
See application file for complete search history.

(56) References Cited

U.S. PATENT DOCUMENTS

| | | | |
|---|---|---|---|
| 7,294,218 B2 * | 11/2007 | Haque et al. .................. | 156/148 |
| 7,862,687 B2 * | 1/2011 | Englert et al. ................ | 162/152 |
| 2003/0060113 A1 * | 3/2003 | Christie et al. ................ | 442/364 |
| 2009/0252941 A1 * | 10/2009 | Mueller et al. ................ | 428/219 |
| 2009/0253323 A1 * | 10/2009 | Mueller et al. ................ | 442/150 |

* cited by examiner

*Primary Examiner* — Mary F Theisen
(74) *Attorney, Agent, or Firm* — Pradip Sahu; David F. Janci; Philip T. Petti

(57) ABSTRACT

A non-woven material, that can be formed into an acoustic ceiling tile, is provided. The material includes a substantially planar and self-supporting core of an inorganic base fiber and a synthetic thermal bonding fiber. The synthetic thermal bonding fiber preferably has an increased bonding surface area that improves adhesion and porosity to provide a base mat or core with a low density to provide sound absorption required by an acoustic ceiling tile.

7 Claims, No Drawings

LOW DENSITY NON-WOVEN MATERIAL USEFUL WITH ACOUSTIC CEILING TILE PRODUCTS

FIELD

The field relates to a non-woven material, and in particular, a low density, non-woven material effective to provide thermal and sound insulation suitable for use as an acoustic ceiling tile.

BACKGROUND

Conventional acoustic ceiling tile is a non-woven structure including a core composed of base fibers, fillers, and binders combined to form the ceiling tile structure. The base fibers are usually mineral wool or glass fibers. The fillers can be perlite, clay, calcium carbonate, cellulose fibers, and the like. The binders are typically cellulose fibers, starch, latex, and the like. Upon drying, the binder forms bonds with the base fibers and fillers to form a fibrous network that provides structural rigidity to the tile and forms a porous structure to absorb sound. To be used as a typical ceiling tile, the non-woven structure or base mat should be substantially flat and self-supporting in order to be suspended in a typical ceiling tile grid or similar structure.

For non-woven structures to be suitable in acoustical ceiling tile applications, the non-woven structure also needs to comply with various industry standards and building codes relating to noise reduction and fire rating. For example, industry standards require ceiling tiles to have a Class A fire rating according to ASTM E84, which generally requires a flame spread index less than 25 and a smoke development index less than 50. Regarding noise reduction, industry standards typically require the acoustical ceiling tile to have a noise reduction coefficient (NRC) according to ASTM C423 of at least about 0.55.

Acoustic ceiling tiles are commonly formed via a wet-laid process that uses an aqueous medium to transport and form the tile components into the desired structure. The basic process involves first blending the various tile ingredients into an aqueous slurry, transporting the slurry to a head box forming station, and distributing the slurry over a moving, porous wire web into a uniform mat having the desired size and thickness. Water is removed, and the mat is then dried. The dried mat may be finished into the ceiling tile structure by slitting, punching, coating and/or laminating a surface finish to the tile. In the wet-laid process, water serves as the transport media for the various tile ingredients. However, while convenient for high production speeds and the ability to use low cost raw materials (for example, recycled newsprint fibers, recycled corrugated paper, scrap polyester fibers, cotton linters, waste fabrics, and the like), using water to manufacture acoustical ceiling tile presents a number of shortcomings that render the process and formed product less than desirable.

The wet-laid process uses a great deal of water to transport and form the components into the ceiling tile structure. The large amount of water must eventually be removed from the product. Most wet processes, therefore, accommodate water removal by one or more steps of free or gravity draining, high and low vacuum, compression, and evaporation. Unfortunately, these process steps entail large energy demands to transport and to remove the water. As such, the handling of large volumes of water to form the tile along with the subsequent removal and evaporation of the water renders the typical wet-laid process relatively expensive due to high equipment and operating costs.

It also is difficult using a wet-laid process to form an acoustical ceiling tile having high sound absorption properties. In a wet-laid process, the formed ceiling tiles tend to have a sealed surface due to the nature of the ingredients in the wet-laid formulation. A ceiling tile with a sealed surface generally has a less efficient acoustical barrier because the tile is less porous, which renders the tile less capable of absorbing sound. The sealed tile surface may actually reflect sounds, which is an undesired characteristic in an acoustical ceiling tile.

These undesired acoustical characteristics are believed to occur from the hydrophilic nature of the tile ingredients typically used in the wet-laid process. Cellulose fibers (for example, recycled newsprint), which are commonly used as low cost binder and filler in a ceiling tile, are highly hydrophilic and attract an extensive amount of water. Due in part to such hydrophilic components, wet-laid tiles typically have a high tipple moisture content (i.e., the moisture level of the board immediately prior to entering the drying oven or kiln) of about 65 to about 75 percent, which increases the demands of evaporation during drying. As a result, a high surface tension is generated on the tile ingredients during drying as water is removed from these hydrophilic components. Water, a polar molecule, imparts surface tension to the other components. This surface tension generally causes the tile surface to be sealed with a less porous structure. It is believed that the surface tension draws elements in the tile closer together densifying the structure and closing the tile pores in the process. Consequently, wet-laid produced ceiling tiles require further processing to perforate the tile in order to achieve acceptable noise reduction. Therefore, while a wet-laid process may be acceptable due to increased production speeds and the ability to use low cost materials, the use of water as a transport media renders the process and resulting product less cost effective when acoustic characteristics are required for the product.

In some cases, a latex binder also may be used in acoustical ceiling tiles and is often preferred in a wet-laid process using mineral wool as the base fiber. Latex, however, is generally the most expensive ingredient employed in a ceiling tile formulation; therefore, it is desired to limit the use of this relatively high cost ingredient. Other binders commonly employed in ceiling tiles are starch and, as described above, cellulose fibers. Starch and cellulose, however, are hydrophilic and tend to attract water during processing and generate the high surface tension problems described above.

A common shortcoming of acoustic ceiling tiles fabricated using a wet-laid process is that such formed tiles generally lead to a higher density through the above described mechanism. The high density is often associated with high air flow resistivity, which compromises acoustical absorption. Typically, tiles made with a conventional formula have a density of about 12 lbs/ft$^3$ to about 20 lbs/ft$^3$ depending upon its composition. They also have a noise reduction coefficient (NRC) of about 0.55 to about 0.80, depending upon specific composition. For basemats with similar compositions, a lower density normally results in lower air-flow resistivity or higher porosity, thus improving acoustical absorption. However, if the composition is different the association of density with porosity is not necessarily as stated above.

Alternative bonding fibers have been developed, but such alternative fibers are still fabricated using hydrophilic components and would, therefore, exhibit the same shortcomings as found in existing ceiling tile ingredients. For example, U.S. Pat. Nos. 6,818,295 and 6,946,506 and US Publication No. 2005/0026529 describe a finely attenuated fiber having a plurality of microfibrils thereon. The inventors of these references suggest that the microfibrils mechanically reinforce a non-woven material to provide improved tensile strength. The fibers in these references, however, are still constructed using a starch matrix, which provides a natural polymer to bind the components together. The starch is important in these cases because it allows any formed material to be biodegradable. However, if the starch described in these references were used to form a ceiling tile, the formed tile would exhibit the same shortcomings as found in the wet-laid tiles because of the hydrophilic nature of the starch. That is, as described above, the starch matrix would be expected to create a high surface tension during water removal and tend to form a sealed surface lowering the ability of the tile to absorb sounds. These references further suggest that the starch matrix can be removed from the fiber structure and only the microfibrils used. In such case, however, if only the individual microfibrils without the benefit of the base fiber structure were used in a ceiling tile, they would not provide a sufficient bonding matrix and strength to function as an effective binder in a ceiling tile structure.

Accordingly, there is a desire for a low density, non-woven structure with a minimum of hydrophilic components that is flat, self-supporting, and suitable under industry standards for an acoustic ceiling tile (i.e., both thermal and acoustic properties) that meets user expectations for manual cutability.

SUMMARY OF THE INVENTION

In general, a low density, non-woven material is provided including an inorganic base fiber and a synthetic thermal bonding fiber. By one approach, the low density, non-woven material is capable of being formed into a core or base mat having a predetermined basis weight and low density sufficient to provide a substantially flat, rigid, and self-supporting material that is capable of providing both thermal and sound characteristics sufficient to be used as an acoustic ceiling tile. The term flat or flatness used herein means the amount of deflection in the middle when a 2 ft long panel is placed on a grid. For instance, a substantially flat panel could have an amount of deflection of about 0.25 inches or less. As used in this disclosure, "low density" generally refers to about 10 lbs/ft$^3$ (pcf) or less, and is generally in the range of about 7 pcf to about 13 pcf. Also, as discussed in this disclosure, "porosity" is quantified by air flow resistivity and may be tested according to ASTM C423 and C386. In addition, this disclosure contemplates that a preferred thickness of tiles made using the process described herein is generally in the range of about 0.5 inches to about 1.0 inches.

DETAILED DESCRIPTION OF PREFERRED EMBODIMENTS

By way of example, the non-woven material is capable of forming a substantially flat or planar self-supporting, sag resistant core that exhibits noise reduction coefficients of at least about 0.55 per ASTM C423 and a Class A fire rating with a flame spread index of about 25 or less and a smoke development index of about 50 or less per ASTM E84. Even with a low density, the core also preferably exhibits a high flexural strength, but can still be manually cut such as using a common utility knife with light or minimal pressure.

In various embodiments, the inorganic base fiber is preferably mineral wool, slag wool, rock wool or mixtures thereof that preferably have a shot content up to about 60 percent by weight and, most preferably, between about 10 to about 45 percent by weight. As used herein, mineral wool shot generally refers to a by-product of the mineral wool manufacturing process comprising non-fibrous, mineral particulate having diameters ranging from about 50 microns to about 500 microns. Suitable inorganic base fibers are Thermafiber FRF brand fibers (USG Interiors, Inc., Chicago, Ill.); however, other inorganic base fibers also may be used, such as glass fibers and the like. The inorganic fibers preferably have an average length from about 0.1 mm to about 4 mm and an average diameter of about 1 to about 15 microns. By one approach, the core of the non-woven material includes about 30 to about 95 percent rock wool or slag wool on a weight basis.

In various embodiments, the synthetic thermal bonding fiber is preferably a single component or bi-component synthetic fiber that, when heated to the appropriate temperature, melts or bonds with surrounding materials. Preferably, the non-woven synthetic material includes about 0.1 to about 50 percent, and most preferably about 1 to about 25 percent of synthetic single component or bi-component fibers on a weight basis. As used herein, "synthetic" refers to a fiber fabricated using components that are not of a natural origin. For example, the synthetic thermal bonding fibers are preferably composed of a polyacrylic, ethylene vinyl acetate, polyester, polyolefin, polyamide, phenol-formaldehyde, polyvinyl alcohol, polyvinyl chloride, or mixtures thereof. These materials generally have a melting point from about 100° C. to about 250° C. Certain synthetic thermal bonding fibers that can be used are composed of polyolefin resins and exhibit a melting point of at least one component from about 125° C. to about 136° C. Fibers composed of materials other than polyolefin resins can also be used and may offer better properties such as strength, but are likely more expensive.

By one approach, the preferred synthetic thermal bonding fibers are generally non-biodegradable and essentially free of starches, proteins, and other naturally occurring polymers, which are largely hydrophilic and would result in the undesired surface tension properties found in the prior art fibers. As discussed further below, the synthetic thermal bonding fibers herein generally remain hydrophobic, even if treated to have a hydrophilic surface to improve dispersion stability.

Preferred synthetic thermal bonding fibers have a high surface area relative to the fiber length and diameter in order to provide a high bonding surface area. For example, preferred synthetic bonding fibers have an average length less than 3 mm (preferably about 0.1 to about 3 mm), an average diameter less than 50 microns (preferably about 5 to about 30 microns), but a large surface area greater than about 0.5 m$^2$/gram and, preferably, between about 1 and about 12 m$^2$/gram. Such surface area is about one to two magnitudes greater than commercially available single component or bi-component thermal bonding fibers, which commonly have a surface area between about 0.1 to about 0.4 m$^2$/gram for fibers of 1 to 6 denier.

The following Table 1 shows a list of surface areas of standard, commercially available un-fibrillated fibers based upon denier and density. For example, as shown in the chart, if a fiber has 3 denier filaments and a density of 0.95 g/cm$^3$, the surface area of standard, unfibrillated synthetic fibers would be 0.199 m$^2$/g.

TABLE 1

Surface area of standard, unfibrillated synthetic fibers in m$^2$/g

| Deniers Per Filament | Density of 0.90 g/cm$^3$ | Density of 0.95 g/cm$^3$ | Density of 1.00 g/cm$^3$ | Density of 1.10 g/cm$^3$ |
|---|---|---|---|---|
| 1 | 0.354 | 0.345 | 0.336 | 0.321 |
| 2 | 0.251 | 0.244 | 0.238 | 0.227 |
| 3 | 0.205 | 0.199 | 0.194 | 0.185 |
| 4 | 0.177 | 0.172 | 0.168 | 0.160 |
| 5 | 0.158 | 0.154 | 0.150 | 0.143 |
| 6 | 0.145 | 0.141 | 0.137 | 0.131 |

To achieve such high surface area relative to the fiber length and diameter, the fibers herein preferably define an elongate fiber base or main body and a multitude of microbranches or microfibrils extending outwardly from an outer surface of the elongate fiber base, or a cluster of microfibrils. For example, a single fiber can define numerous microfibrils that each has a diameter from about 0.1 microns to about 10 microns. Suitable high surface area, fibrillated fibers can be obtained from Mitsui Chemicals America (Rye Brook, N.Y.) or Minifibers (Johnson City, Tenn.).

In the preferred embodiments, the synthetic thermal bonding fibers are preferably hydrophobic and, therefore, generally do not result in an increased surface tension during drying that is found in prior art wet-laid formed ceiling tiles. The synthetic thermal bonding fibers of the preferred embodiments form a generally porous and lofty structure that is capable of providing desired sound reduction characteristics at a low density. It is believed that one of the reasons that the resulting structure is more porous is that there are fewer hydrogen bonds present when there are more hydrophobic thermal bonding fibers in comparison to structures in which there is more cellulose. On the other hand, the high surface area of fibrillated synthetic fibers offer increased bonding sites, improving strength without compromising the cuttability.

In some cases, the hydrophobic nature of the synthetic fibers renders it difficult to disperse them in an aqueous slurry. To improve the dispersion stability, the synthetic thermal bonding fibers also may be surface treated to render an outer surface or a portion of the outer surface hydrophilic. To make the outer surface hydrophilic, a fiber manufacturer introduces certain hydrophilic functional groups such as carboxylic group (—COOH) or hydroxyl group (—OH) in the polymer used to form fibers. With a hydrophilic outer surface, the synthetic thermal bonding fibers are generally more stable in an aqueous slurry.

The non-woven materials herein generally yield desired noise reduction coefficients of at least 0.55 and greater. It is believed that at least two mechanisms may be responsible for the noise reduction characteristics with core densities of about 7 to 13 pcf. First, as described above, the preferred synthetic thermal bonding fibers are hydrophobic, which reduces the surface tension of the core during drying. As a result, the hydrophobic fibers generally avoid the closure of pores in the surface and body of the formed core that occurs with the hydrophilic fibers of the prior art. In addition, it has also been observed that even if the fibers are treated to have a hydrophilic surface, the synthetic, fibrillated thermal bonding fiber as a whole still exhibits hydrophobic properties to reduce surface tension upon drying.

It is believed that hydrophilic treated fibers still exhibit hydrophobic tendencies during drying because the treated fibers have just enough hydrophilic functional groups attached to hydrophobic polymer chains so that they can be suspended in water and dispersed with other ingredients. However, the bulk of these fibers are still hydrophobic, and they have a very low water absorbency. When the polymer melts it does not lose these groups, so the hydrophobic tendencies remain.

Secondly, the synthetic thermal bonding fibers have at least a portion that is set to melt at a predetermined temperature where the base fibers and other core components are bound together. In the case of fibrillated synthetic thermal bonding fibers, there is preferably no bonding between any core components prior to this predetermined melting temperature. As a result, it is believed that even with a wet-laid process, the inorganic base fiber and other ingredients will generally assume a more natural/lofty configuration or form as found in an air-laid process. In particular, with the use of an inorganic base fiber of mineral wool, the formed mat generally becomes very bulky or lofty because these fibers are relatively stiff and form the lofty structure. Therefore, once the core finally reaches the melting point of the synthetic bonding fiber after drying, the binder material fuses the matrix of stiff mineral wool into this lofty structure. Upon cooling, the fibrillated, synthetic bonding fibers set the tile components and provide rigidity to the tile even with the lofty structure. Because the synthetic fibers do not exhibit the increased surface tension of the prior art binders, the formed lofty structure generally remains intact rather than being densified due to the surface tension caused by water evaporation.

Optionally, the non-woven core may include other components. For example, the core may include other fillers such as cellulose fibers (i.e. newsprint), calcium carbonate, perlite, glass beads, clay, granulates, cork, and the like as needed. If desired, functional chemicals, such as zeolite, active carbon and the like, also may be added to the base mat to generally provide air cleaning capabilities. In addition to the inorganic base fibers and synthetic thermal bonding fibers, the core can also include other optional fibers, such as natural fibers (flax, bamboo, cellulose, sisal, and the like), glass fibers, other inorganic fibers, organic fibers and mixtures thereof as needed. If desired, the non-woven material also may include a powdered, liquid, or latex resin applied to one or more surfaces of or impregnated into the formed base mat to provide additional rigidity, binding, a water barrier, or other functional properties. For example, up to about 30 weight percent of a resin may be applied to one or both surfaces of the base mat.

In addition, the formed base mat may comprise one or more layers of the non-woven materials. If multi-layered, each layer may have similar or distinct properties as the other layers, such as similar or distinct basis weights, densities, and compositions as needed for a particular application. Multiple layers may be formed from laminating multiple base mats together or may be formed in-line using a multi-head forming machine.

The non-woven materials comprising the inorganic base fiber and the synthetic thermal bonding fiber can be formed into a core suitable for an acoustic ceiling tile using any standard process to form non-woven materials, such as a wet-laid, a dry-laid, or an air-laid forming process. For example, if using a wet-laid process, the synthetic thermal bonding fiber is preferably first defiberized with a hydraulic pulper, deflaker, refiner, or other suitable equipment. The defiberized synthetic fiber is then blended into an aqueous slurry. By one approach, it is preferred that the slurry have a solids content of about 1 to about 15 percent. Such slurry can then be used to form a non-woven core having about 0.1 to about 50 percent by weight of the synthetic thermal bonding fiber and about 50 to about 95 percent by weight inorganic base fiber such as mineral wool, slag wool, and/or rock wool using a standard wet-laid head box.

After core formation, water is then removed via gravity drain, vacuum, and/or heating as needed. A typical tipple moisture level for the non-woven material in accordance with the invention (i.e., the moisture level of the board immediately prior to entering the drying oven or kiln) when vacuumed at about 7 inches of mercury to about 10 inches of mercury is about 60%. In contrast, the typical moisture content for boards made from standard materials is 70%. As the synthetic fiber content increases, the tipple moisture decreases. If desired, a press may be used to provide a smooth surface to the mat and to help control the final density. Preferably, the drying oven operates at about 300° F. or at least about 5 to about 50° F. higher than the melting point of the synthetic bonding fiber to ensure sufficient melting and bonding of the tile ingredients. If desired, after heating the core or mat also may be cooled and/or enclosed within an air circulation system.

To achieve a uniform distribution of the non-woven mat, a well-dispersed synthetic thermal bonding fiber is preferred. It has been discovered that an optimal dispersion of synthetic fibers and inorganic base fibers can be achieved using a slurry temperature of about 50° C., but a range of about 30° C. to about 70° C. have been shown to work well. It is believe that this range of temperature is significant because some commercial fibrillated synthetic fibers are sold as wet laps, which require re-pulping to be used. The higher temperature helps to reduce the slushing time and dispersion. Next, the slurry is mixed for about 10 minutes to about 30 minutes, until the slurry is substantially homogeneous. Preferably, the synthetic thermal bonding fibers are also dispersed in water prior to the addition of other slurry components to ensure a good dispersion quality. To verify dispersion, the slurry should be checked with a glass cylinder or blue glass to ensure the synthetic fiber is completely dispersed.

One reason why it is important to ensure enough time is taken to complete dispersion is that some commercial fibrillated synthetic fibers, as just mentioned, are in the form of mats which require dispersion before use. Complete dispersion or re-pulping ensures that the fibers provide the maximum number of bonding sites, therefore improving mechanical strength and porosity. If there is inadequate dispersion, the fibers could bond together by themselves, and they could lose effectiveness as a binder. On the other hand, some commercial synthetic fibers are fluff dried and do not require extensive time to achieve adequate dispersion.

In addition, as described above, to improve the dispersion quality, the synthetic fibers also may be surface treated to render them hydrophilic at least on an outer surface thereof. In the case of bi-component fibers, mechanical pretreatment can make the fibers more suitable to make ceiling tiles. The pretreatment comprises drying the fibers, milling the fibers and creating fibrils. The dry milling process itself generates sufficient forces and shear actions to further fibrillate the fibers as well.

Advantages and embodiments of the non-woven materials described herein are further illustrated by the following examples; however, the particular materials and amounts thereof recited in these examples, as well as other conditions and details, should not be construed to limit the non-woven material. All percentages mentioned above and hereafter are by weight unless otherwise indicated.

EXAMPLES

Example 1

About 75 grams of E 380F fluff dried polyethylene pulp (Minifibers) was dispersed in water and then mixed with about 425 grams of mineral wool at about 5 percent consistency for about 4 min (about 15 percent polyethylene pulp based on dried solids). The slurry was poured into a 14×14 inch forming box. Excessive water was first drained by gravity, and then further removed using about 7" Hg vacuum. Without pressing, the formed board was directly placed into a drying oven at about 300° F. for 3 hrs. Upon cooling, the board became relatively rigid. The formed tile exhibited the following characteristics:

| | |
|---|---|
| Thickness: | 1.2 inches |
| Noise reduction (NRC): | 0.88 |
| Density | 8.2 pcf. |

Example 2

About 75.6 grams of E 380F fibers was dispersed in water and mixed with about 428.4 grams of mineral wool at 5 percent consistency for 4 min similar to Example 1 (about 15% E380F fibers). The stock was poured into a forming box as in Example 1. Excessive water was first drained, and then further removed with about 8" Hg vacuum for about 30 sec. The board was then pressed to about 0.45" thickness, and dried in an oven at 300° F. for 3 hrs. Upon cooling, the board became relatively rigid. The formed board exhibited the following characteristics:

| | |
|---|---|
| Thickness | 0.97 inches |
| Density | 9.2 pcf |
| Noise reduction (NRC) | 0.82 |
| Modulus of rupture (MOR) | 15 psi |

Example 3

Fybrel E790 (Mitsui Chemicals America), in the form of wet lap, was first dispersed in a hydraulic pulper at about 4.8 percent consistency. After mixing about 47.1 grams of the Fybrel790 with about 267 grams of mineral wool for 4 min, the slurry was poured into a 14"×14" forming box (about 15 percent Fybrel). Excessive water was first gravity drained, and then further removed with about 8" Hg vacuum for 30 sec. The board was then pressed to about 0.295" thickness, and dried in an oven at 300° F. for 3 hr. Upon cooling, the board became relatively rigid. The board exhibited following characteristics:

| | |
|---|---|
| Thickness | 0.7 inches |
| Density | 7.81 pcf |
| Noise Reduction (ENRC) | 0.61 |
| Modulus of Rupture (MOR) | 6 psi |

Comparative Example 4

About 47.1 grams of Fybrel E790 (Mitsui Chemicals America) was mixed with about 219.8 grams of mineral wool, about 47.1 grams of newsprint, and about 25 grams of calcium carbonate for about 4 min (about 13.8 percent Fybrel). The slurry was then poured into a 14"×14" forming box as in Example 1. Excessive water was first gravity drained, and then further removed with about 11" Hg vacuum. The board was then pressed to about 0.265" thickness, and dried in an oven at 300° F. for about 3 hr. Upon cooling, the board became relatively rigid. The board exhibited the following characteristics:

| | |
|---|---|
| Thickness | 0.38 Inches |
| Density | 16.5 pcf |

-continued

| Noise Reduction (ENRC) | 0.4 |
|---|---|
| Modulus of Rupture (MOR) | 34 psi |

It is noted in Comparative Example 4, 13.5% cellulosic fibers (newsprint) was used in the formulation. The hydrophilic cellulosic fibers generated high surface tension, densifying the board during drying. As a result, the density is high, porosity is low, and NRC is low.

Comparative Example 5

About 61.1 grams of SS 93510, a hydrophilic fibrillated PE fiber (Minifibers), was mixed with about 346 grams of mineral wool at 4.5 percent consistency for about 4 min (about 15 percent PE fibers). The slurry was then poured into a 12"×12" forming box. Excessive water was first gravity drained, and then further removed with vacuum. Hot air was then pulled through the mat with vacuum. When the mat temperature reached 300° F., the mat was heated for about 8 min. Upon cooling, the board became relatively rigid. The board exhibited the following characteristics:

| Thickness | 0.75 inches |
|---|---|
| Density | 13.14 pcf |
| Noise Reduction (ENRC) | 0.69 |
| Modulus of Rupture (MOR) | 13 psi |

It is noted in this Comparative Example 5 that the achieved high density is a result of through-air drying. The mat is under vacuum to allow hot air going through the mat, thus densifying the mat. This example also showed that through-air drying helps to keep the porosity during drying, thus, better NRC, at a similar density.

Example 6

About 108 grams of ESS50F, a hydrophilic fibrillated PE fiber (Minifibers), was first dispersed in water at about 2 percent consistency. Then the dispersed fibers were mixed with about 403 grams of mineral wool for about 4 min (about 21 percent PE fibers). The slurry was then poured into a 14"×14" forming box. Excessive water was first gravity drained, and then further removed with about 6.8" Hg vacuum. The board was then pressed to about 0.49 inches thickness and dried in an oven at 300° F. for about 3 hours. Upon cooling, the board became relatively rigid. The board exhibited the following characteristics:

| Thickness | 0.83 inches |
|---|---|
| Density | 10.6 pcf |
| Noise Reduction (ENRC) | 0.8 |
| Modulus of Rupture (MOR) | 23 psi |

Comparative Example 7

About 75.6 grams of E990, a fibrillated PE fiber (Minifibers), with relatively long fiber lengths (2.1 mm), was first dispersed in water. After mixing with about 428.4 grams of mineral wool for about 4 min, about 151 grams of expanded perlite (USG, Red Wing, Minn.) was added at the end of mixing (about 11.5 percent PE fibers). The slurry was then poured into a 14"×14" forming box. Excessive water was first gravity drained, and then further removed with about 6.8" Hg vacuum for about 30 sec. After being pressed to a thickness of about 0.71 inches, the board was dried in an oven at 300° F. for about 3 hours. Upon cooling, the board became relatively rigid. The formed board exhibited the following characteristics:

| Thickness | 0.88 inches |
|---|---|
| Density | 12.88 pcf |
| Noise Reduction (ENRC) | 0.77 |
| Modulus of Rupture (MOR) | 14 psi |

It is noted that in this Example 7, it is shown that the addition of a light-weight filler, expanded perlite, does not compromise acoustical absorption. Normally in a typical wet-laid process, the more perlite that is added into a basemat, the lower the NRC. In this case, the high density is a result of added filler. This is important because perlite can be added to ceiling tile components to improve surface burning and strength characteristics.

It will be understood that various changes in the details, materials, and process conditions which have been herein described and illustrated in order to explain the nature of the non-woven material may be made by those skilled in the art within the principle and scope as expressed in the appended claims. In addition, any reference cited herein is also hereby incorporated herein by reference in its entirety.

What is claimed is:

1. A method of forming an acoustic ceiling tile comprising:
    preparing an aqueous slurry that includes synthetic thermal bonding fibers and inorganic base fibers, the synthetic thermal bonding fibers having a plurality of microbranches extending from outer surfaces thereof to provide a bonding surface area;
    forming the aqueous slurry into a non-woven material having a substantially planar and self-supporting core of up to about 7 pcf to about 13 pcf; and
    forming the core into the acoustic ceiling tile to exhibit a noise reduction coefficient of at least about 0.55.

2. The method of claim 1, wherein the aqueous slurry has a core solids content from about 1 percent to about 15 percent by weight.

3. The method of claim 1, wherein the aqueous slurry is blended at a temperature of about 30° C. to about 70° C.

4. The method of claim 1, wherein the synthetic thermal bonding fibers have an average fiber length of about 3 mm or less, an average fiber diameter of about 30 microns or less, and the bonding surface area is at least about 0.5 m²/gram to about 12 m²/gram.

5. The method of claim 1, wherein the synthetic thermal bonding fibers comprise substantially hydrophobic thermal bonding fibers.

6. The method of claim 5, wherein the substantially hydrophobic thermal bonding fibers have a hydrophilic surface sufficient to permit dispersion in the aqueous slurry.

7. The method of claim 4, wherein the synthetic thermal bonding fibers comprise substantially hydrophobic thermal bonding fibers.

* * * * *